(12) United States Patent  (10) Patent No.: US 8,239,153 B2
Piemonte et al.  (45) Date of Patent: Aug. 7, 2012

(54) DYNAMIC COMPASS CALIBRATION IN A PORTABLE DEVICE

(75) Inventors: Patrick S. Piemonte, San Francisco, CA (US); Madhu Shrivastav, San Jose, CA (US); Puneet Mishra, Santa Clara, CA (US); Robert Mayor, Half Moon Bay, CA (US); Ronald K. Huang, Milpitas, CA (US); Parin Patel, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 421 days.

(21) Appl. No.: 12/479,203

(22) Filed: Jun. 5, 2009

(65) Prior Publication Data

US 2010/0312510 A1    Dec. 9, 2010

(51) Int. Cl.
 *G01C 17/38*  (2006.01)
(52) U.S. Cl. ............................................ 702/92; 33/326
(58) Field of Classification Search .............. 702/92–94, 702/141, 151, 153, 154; 33/324, 326, 356, 33/357
See application file for complete search history.

(56) References Cited

U.S. PATENT DOCUMENTS

| | | | |
|---|---|---|---|
| 5,349,529 A | 9/1994 | Masumoto et al. |
| 5,761,094 A | 6/1998 | Olson et al. |
| 5,946,813 A | 9/1999 | Nachbaur et al. |
| 6,311,129 B1 | 10/2001 | Lin |
| 6,384,384 B1 | 5/2002 | Connolly et al. |
| 6,408,245 B1 | 6/2002 | An et al. |
| 6,424,914 B1 | 7/2002 | Lin |
| 6,508,316 B2 | 1/2003 | Estes et al. |
| 6,539,639 B2 | 4/2003 | Smith |
| 6,622,091 B2 | 9/2003 | Perlmutter et al. |
| 6,651,003 B2 | 11/2003 | Woloszyk et al. |
| 6,807,485 B1 | 10/2004 | Green |
| 6,988,049 B1 | 1/2006 | Wirtz et al. |
| 7,210,236 B2 * | 5/2007 | Sato et al. ...................... 33/356 |
| 7,248,983 B2 | 7/2007 | Fillatreau et al. |
| 7,275,008 B2 | 9/2007 | Plyvänäinen |
| 7,331,115 B2 | 2/2008 | Schierbeek et al. |
| 7,391,366 B2 | 6/2008 | Park et al. |
| 7,451,549 B1 | 11/2008 | Sodhi et al. |
| 7,458,166 B2 | 12/2008 | Parks et al. |
| 2003/0135327 A1 | 7/2003 | Levine et al. |
| 2005/0174324 A1 | 8/2005 | Liberty et al. |

(Continued)

FOREIGN PATENT DOCUMENTS

EP    1221586 A2    7/2002

(Continued)

OTHER PUBLICATIONS

"Honeywell 3-Axis Digital Compass IC HMC5843", Electronic Compass, Jun. 2010 Honeywell International Inc., Product Datasheet and Specification, Internet retrieval at: www.honeywell.com, (21 pages).

(Continued)

*Primary Examiner* — Manuel L Barbee
(74) *Attorney, Agent, or Firm* — Blakely, Sokoloff, Taylor & Zafman LLP (57) ABSTRACT

The magnitude of a sensed, raw magnetic field in a portable device is monitored over a given time interval. The monitored magnitude is compared with predetermined criteria. Based on the comparison, recalibration of a compass function is signed. Other embodiments are also described and claimed.

11 Claims, 4 Drawing Sheets

PORTABLE DEVICE 100

U.S. PATENT DOCUMENTS

| | | |
|---|---|---|
| 2005/0223575 A1 | 10/2005 | Fillatreau et al. |
| 2006/0066295 A1 | 3/2006 | Tamura et al. |
| 2006/0271295 A1 | 11/2006 | McLaren et al. |
| 2007/0156337 A1 | 7/2007 | Yanni |
| 2008/0066331 A1 | 3/2008 | Brzezinski et al. |
| 2008/0201096 A1 | 8/2008 | Wright et al. |
| 2009/0089001 A1 | 4/2009 | Lin |
| 2009/0171607 A1 | 7/2009 | Chen et al. |
| 2010/0121559 A1 | 5/2010 | Boeve et al. |

FOREIGN PATENT DOCUMENTS

| | | |
|---|---|---|
| JP | 2005134343 | 5/2005 |
| WO | WO 2008122904 A2 * | 10/2008 |
| WO | WO-2008122904 A2 | 10/2008 |

OTHER PUBLICATIONS

Westerberg, Tommy, "Compass Go", Category: Navigation, Apple Apps Store, Oct. 10, 2008, (3 pages).

U.S. Appl. No. 12/886,531, filed Sep. 20, 2010, entitled "Determining Heading Using Magnetometer Data and Angular Rate Data", Inventors: Piemonte, et al., (Whole Document).

U.S. Appl. No. 12/899,392, filed Oct. 6, 2010, entitled "Magnetometer Calibration", Inventor: Tu, (Whole Document).

Camps, Frédéric, et al., "Numerical Calibration for 3-Axis Accelerometers and Magnetometers", IEEE, 2009, (pp. 217-221).

Zhang, Xiaoming, et al., "A Novel Auto-Calibration Method for the Vector Magnetometer", The Ninth International Conference on Electronic Measurement & Instruments, ICEMI 2009, (pp. 1-145 through 1-150).

Apptism, iTopoMaps, © 2009 Apptism, [Online] [Retrieved on Jun. 2, 2009]. Retrieved from the Internet: URL: http://www.apptism.com/apps/itopomaps, (4 pages).

Apptism, Compass Go, © 2009, Apptism, [Online] [Retrieved on Jun. 3, 2009]. Retrieved from the Internet: URL: http://www.apptism.com/apps/compass-go, (2 pages).

Apptism, Focalware, © 2009 Apptism, [Online] [Retrieved on Jun. 3, 2009]. Retrieved from the Internet: URL: http://www.apptism.com/apps/focalware, (2 pages).

U.S. Appl. No. 12/479,483, filed Jun. 5, 2009, entitled "Restoring and Storing Magnetometer Calibration Data", Inventors: Mayor, et al., (Whole Document).

U.S. Appl. No. 12/477,865, filed Jun. 3, 2009, entitled "Automatically Identifying Geographic Direction", inventors: Huang, et al., (Whole Document).

U.S. Appl. No. 12/479,717, filed Jun. 5, 2009, entitled "Magnetometer Accuracy and Use", inventors: Mayor, et al., (Whole Document).

U.S. Appl. No. 12/549,250, filed Aug. 27, 2009, entitled "Context Determination to Assist Location Determination Accuracy", inventors: Mayor, et al., (Whole Document).

"Calibration Computations for Practical Compassing Using the PNI-11096 Magnetometer ASIC", Aug. 2008, PNI Sensor Corporation © 2001, PNI Corporation Santa Rosa, CA, USA, (3 pages).

"Multipoint Calibration Primer", PNI Sensor Corporation, (no publication date available), PNI Corporation, Santa Rosa, CA, (10 pages).

"The Earth's Magnetic Field", EPS 122: Lecture 5—Earth's magnetic field, (11 pages).

"The Earth's Magnetic Field—An Overview", An Overview of the Earth's Magnetic Field, [Online] [Retrieved on May 16, 2009]. Retrieved from the Internet: URL: http://www.geomag.bgs.ac.uk/earthmag.html, (10 pages).

Cho, Seong Y., et al., "A Calibration Technique for a Two-Axis Magnetic Compass in Telematics Devices", ETRI Journal, vol. 27, No. 3, Jun. 2005, (pp. 280-288).

Goulet, Chris M., "Magnetic Declination, Frequently Asked Questions", Version 4.4, Oct. 2001, [Online] [Retrieved on May 16, 2009]. Retrieved from the Internet: URL:http://www.geocities.com/magnetic_declination/, (16 pages).

* cited by examiner

DYNAMIC COMPASS CALIBRATION IN A PORTABLE DEVICE

Some of the subject matter described in this application is related to material in U.S. application Ser. No. 12/479,483 entitled "Restoring and Storing Magnetometer Calibration Data", which was filed on the same date as this application.

An embodiment of the invention is related to techniques for calibrating an electronic compass that is integrated in a portable electronic device. Other embodiments are also described.

BACKGROUND

A portable device such as a cellular phone or a smart phone can now be equipped with an electronic compass. The compass calculates and provides its user with a direction, which may be a "heading" (typically given relative to the Earth's magnetic field), and/or an arrow pointing to true north. The direction information may be provided for the user's own navigation knowledge, for example, to tell him which way is north while he is walking or driving in unfamiliar surroundings. The direction information is also beneficial for use by a navigation or map application that may be running in the device.

The electronic compass obtains a measure of the magnetic field that is present in its immediate surrounding as a three-component (e.g., in x, y, and z directions) vector, using a 3-axis magnetic sensor. The sensed field contains a contribution by the Earth's magnetic field, and a contribution by a so-called local interference field. The latter is the magnetic field that is created by components in the local environment of the portable device. This may include contributions by any magnetic component that is near the sensor, such as a loudspeaker that is built into the device. The interference field may also have a contribution due to magnetic elements found in the external environment close to the device, such as when the user is driving an automobile, riding in a train or bus, or riding on a bicycle or motorcycle.

In most cases, the interference field is not negligible relative to the Earth field. Therefore, a calibration procedure is needed to estimate and then remove the interference field contribution from the sensor's measurements, in order to allow the compass to calculate the correct direction at that moment. There are several types of 3-axis calibration procedures. In one such technique, the user is instructed to rotate the device (containing the compass) according to a set of geometrically different orientations and azimuth angles, while measurements by the compass and by an orientation sensor are collected and analyzed so as to isolate or solve for the interference field. The solved interference field is then subtracted from a measurement taken by the magnetic sensor, to yield the geomagnetic field (which may then be further corrected into the true north direction).

In another 3-axis calibration technique, rather than instruct the user to deliberately rotate the device in a predetermined manner, many measurements are collected from the compass, continuously over a period of time, while the device is being used or carried by the user in the usual course. This typically leads to random albeit sufficient rotations of the device, which enable solving for the interference field. This technique is desirably transparent to the user because the user is not required to go through a procedure where he must deliberately rotate the device through a specified set of orientations.

The magnetic conditions surrounding the magnetic sensor typically change over time, for example as the user carrying the portable device moves into different locations, reconfigures the device (e.g., opens or closes a clam shell type cellular phone), or places the device near objects that have different magnetic signatures. The magnetic sensor can also drift over time. As a result, the compass needs to be recalibrated often. With existing techniques, calibration output data is verified by comparing it to certain calibration criteria; the data is either rejected (if the criteria are not met) or it is passed on to a heading computation process (if the criteria are met). Once a new heading has been computed using the validated calibration output data, the new heading is verified by comparing it to certain heading criteria; the new heading is either rejected (if the criteria are not met) or accepted (if the criteria are met), where in the latter case it will then be displayed to the user or used by a navigation application running in the portable device.

SUMMARY

One of the drawbacks of current electronic compass technology, integrated in a portable device such as a smart phone or cellular phone, is that due to being subjected to widespread and variable magnetic interference sources, the compass direction output is in error quite often. This characteristic of the integrated compass may be ameliorated, by using an improved technique that indicates when the environment in which the portable device and/or the magnetic sensor find themselves has changed, such that the calibration process needs to be restarted.

In accordance with an embodiment of the invention, a machine-implemented method for dynamic calibration of a compass in a portable device operates as follows. A magnetic field surrounding the device is monitored during a given time interval, as the portable and its compass function are being used in the normal course by the end user. For example, the magnitude of the magnetic field and the geomagnetic inclination or dip of the geomagnetic field may be monitored during the same time interval. When certain criteria relating to the monitored magnetic field magnitude and geomagnetic inclination angle are met, then this indicates that a new environment has been entered or created around the portable device or the magnetic sensor, such that immediate recalibration is needed.

In another embodiment, in addition to the magnetic field, one or more of position, orientation and movement (POM) of the portable is also monitored during the same interval. Changes in the monitored magnetic field are compared with changes in the monitored POM, to determine when the portable device or magnetic sensor finds itself in a different environment at which time recalibration of the compass is signaled. For example, whenever the change in the monitored magnetic field is large relative to the change in the monitored POM, recalibration of the compass is signaled. As a further example, when the percentage change in the magnetic field is larger than the percentage change in the POM, then recalibration is signaled. This might occur where, for example, the user has been walking for several minutes while carrying the portable and has now gotten into his car; the presence of the car has significantly altered the compass' interference field, but the change in the location of the portable on Earth is by contrast small (in terms of experiencing a change in the geomagnetic field). Other user contexts that can cause an expected change in the monitored magnetic field relative to an expected change in the monitored POM, signifying a change in the environment calling for recalibration, are possible.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments of the invention with reference to the appended drawings are now explained. While numerous details are set forth, it is understood that some embodiments of the invention may be practiced without these details. In other instances, well-known circuits, structures, and techniques have not been shown in detail so as not to obscure the understanding of this description.

A compass outputs a direction, either a heading or a vector pointing to true north. An electronic compass has a magnetic sensor also referred to as a magnetometer that cannot tell the difference between the geomagnetic field and the local interference field. A calibration procedure is used to find and remove the interference field, so as to determine the geomagnetic field. However, a portable device can be used in a variety of different ways by its end user, causing the device to end up in a variety of environments with different magnetic fields. In accordance with the embodiments of the invention described below, a portable device can be equipped with improved techniques for triggering recalibration so that the compass becomes a more reliable tool for the end user.

Figure 1:
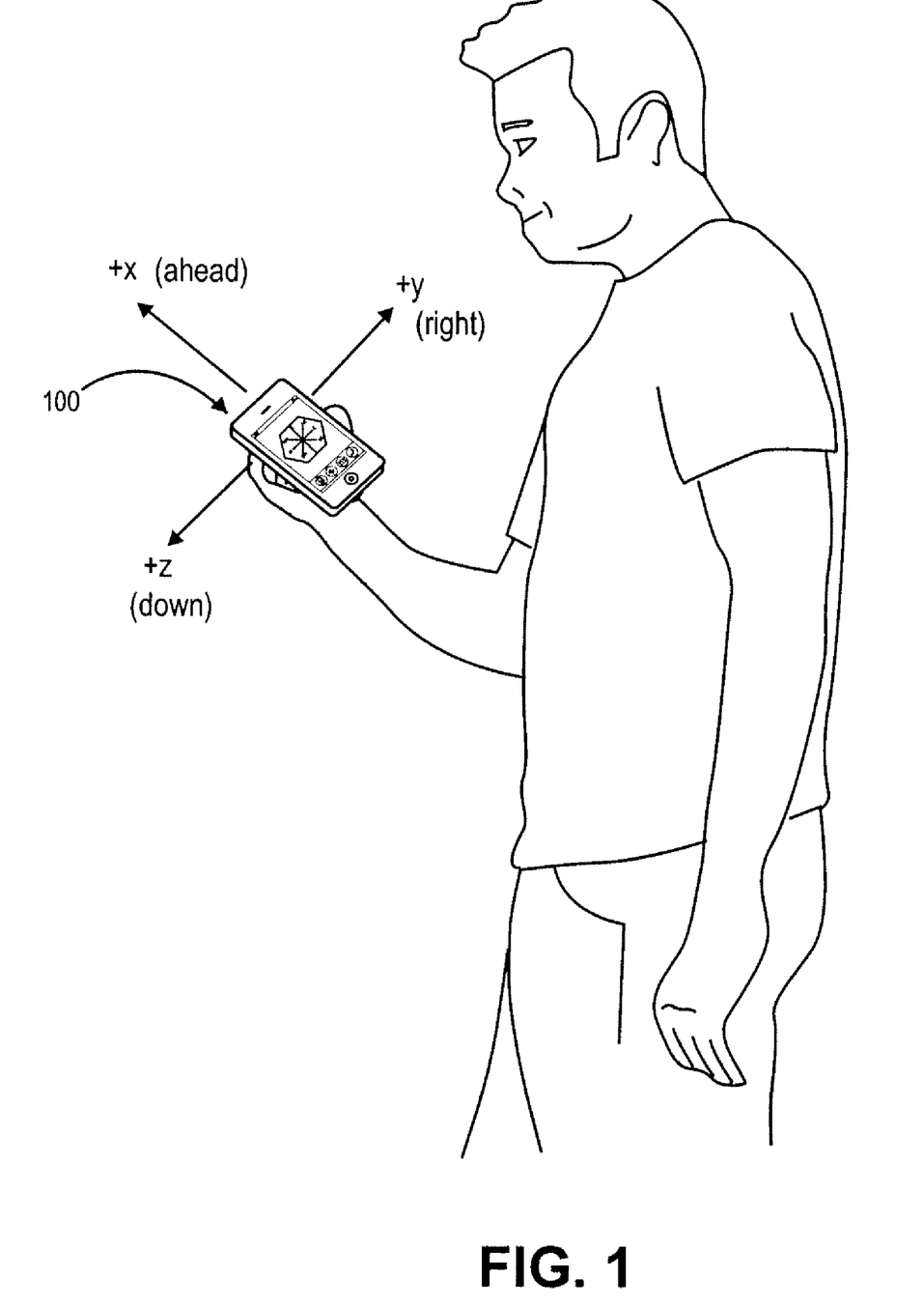
FIG. 1 depicts an example portable device being carried by the end user, with a compass function operating in device.

A portable device 100 having an integrated compass function is depicted in FIG. 1, as an otherwise conventional smart phone containing a loudspeaker, the latter being an example component that contributes substantially to the interference field. However, the compass techniques described here are also applicable to other types of portable devices that have a built-in compass, such as a cellular phone or a dedicated navigation device.

As explained below, the accuracy of the compass in such a portable device can vary greatly depending upon how the device 100 is being carried or used by its end user; this is referred to as the particular user context or environment in which the portable device 100 finds itself. The local magnetic interference field can change depending upon user context; for example, when the user boards a vehicle or moves to a location that changes the interference field, the previously calibrated estimate of the geomagnetic field may no longer be accurate.

Figure 2:
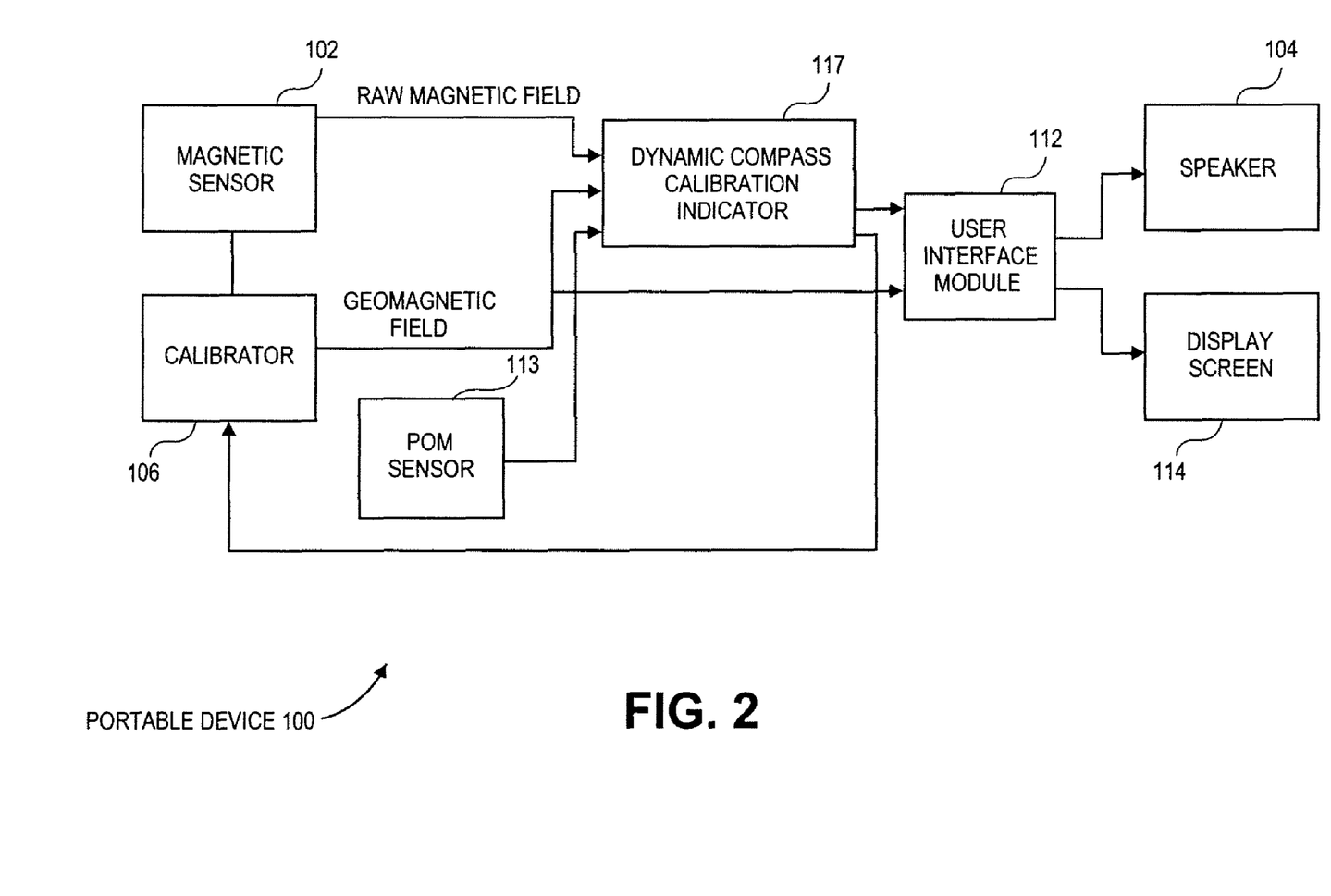
FIG. 2 is a block diagram showing some functional components of the portable device relevant to its compass function, in accordance with an embodiment of the invention.

Referring now to FIG. 2, this is a block diagram showing some functional components of the portable device 100 relevant to its compass function. The compass function is performed using a magnetic sensor 102. This may be a conventional 3-axis magnetometer that senses the local magnetic field and outputs a vector having three components (e.g., x, y and z axis components). An example orientation of the sensor 102 inside the device 100 may be as shown in FIG. 1, where the positive x-axis points straight ahead, the positive y-axis points to the right of the user, and the positive z-axis points downward—other orientations of the sensor relative to the housing of the device 100 are possible. The sensor 102 may be implemented as part of a separate, integrated circuit or microelectronic die referred to as a compass chip.

The compass function also needs a calibrator 106 so that the unwanted interference field contribution can be identified and removed from a measurement provided by the magnetic sensor 102. In one embodiment, the calibrator 106 is a programmed processor that performs a conventional 3-axis calibration procedure, by instructing the user to rotate the device 100 according to a set of geometrically different orientations or azimuth angles, while measurements by the sensor 102 are collected and analyzed so as to isolate the interference field. The solved for interference field is then removed from a measurement taken by the magnetic sensor 102 (e.g., via subtraction and scaling), to provide the estimated or calibrated geomagnetic field. In another 3-axis calibration technique, rather than expect or require that the user deliberately must rotate the device 100 in a certain manner, the calibrator 106 continuously collects a number of measurements from the sensor 102 over a period of time, while the device is being used or carried by its user in the usual course. This typically leads to random albeit sufficient rotations of the device 100, such that the unknown interference field vector can be solved for. This technique is desirably transparent to the user because the user is not required to deliberately rotate the device 100 to go through a specified set of orientations. Other calibration procedures that can be implemented by the calibrator 106 are possible.

A user interface module 112 is coupled to drive either one or both of a speaker 104 and a display screen 114 of the portable device 100. The user interface module 112, which may also be a programmed processor, receives commands from the calibrator 106 to update the compass direction output. This may be done using an audible tone or speech sequence played through the speaker 104, and/or a graphic or text object displayed on the screen 114 (see FIG. 1).

The calibrator 106 can compute multiple instances of the geomagnetic field as time passes, while the compass function is enabled in the portable device 100 and the end user is using the device 100 in its normal course. These instances of the estimated geomagnetic field may then be provided to a dynamic compass calibration indicator module 117. The module 117 may also receive instances of the raw (uncalibrated) magnetic field directly from the magnetic sensor 102.

In one embodiment of the invention, the dynamic calibration indicator module 117 monitors a magnetic field surrounding the device 100 during a given time interval, as the device 100 and its compass function are being used in the normal course by the end user. For example, the magnitude of the raw magnetic field and a geomagnetic inclination or dip, I, of the geomagnetic field may be monitored, during the same time interval. For a geomagnetic field F given by its components (X,Y,Z), the inclination or dip, I, may be defined as follows, $$I = \arctan(Z/H)$$

where Z is the z-axis component of the estimated geomagnetic field and H is its horizontal intensity given by $H = \text{square\_root}(X^{}2 + Y^{}2)$ When certain criteria relating to the monitored magnetic field magnitude and geomagnetic inclination are met, then this indicates that a new environment or user context has been entered or created around the magnetic sensor, such that immediate recalibration of the geomagnetic field is needed. Recalibration of the compass refers to recalculating the estimated interference field, by collecting a new set of magnetic sensor measurements. For example, where the calibrator 106 might be designed to periodically calibrate the compass every fifteen minutes, this cycle is overridden by the signaled recalibration.

The criteria for when to signal recalibration may be determined in advance and stored in the device 100. To determine the criteria, experiments may be performed on like specimens of the device 100 where statistical data is gathered to determine patterns in the raw and estimated magnetic fields, where such patterns indicate changes in user contexts that likely require recalibration (in order maintain accuracy of the compass direction output in the new environment).

In another embodiment, in addition to the magnetic field, one or more of position, orientation and movement (POM) of the portable device 100 is also monitored during the same interval. To this end, one or more position, orientation or movement (POM) sensors 113 are present in the device 100. Such sensors may include an accelerometer, an inertial sensor, a gyroscopic sensor, a tilt sensor, a yaw sensor, and/or a pitch sensor. A POM sensor 113 may also include a radio frequency triangulation-based locating device, such as a global positioning system (GPS). The POM sensor 113 may be integrated in the portable device 100, and in particular may be mechanically fixed such that there is no relative movement between it and the magnetic sensor 102. As an example, a POM sensor 113 may be in the physical form of a separate, accelerometer chip that is installed on the same circuit board as the compass chip, where the circuit board is housed inside the device 100.

Returning to the dynamic calibration process, the changes in the monitored magnetic field are compared with changes in the monitored POM, to determine when the portable device 100 (or the magnetic sensor 102) finds itself in a different environment, at which time recalibration of the compass is signaled. For example, whenever the change in the monitored magnetic field is large relative to the change in the monitored POM, recalibration of the compass is signaled. As a further example, when the percentage change in the magnetic field is larger than the percentage change in the POM, then recalibration is signaled. This might occur where, for example, the user has been walking for several minutes while carrying the portable and has now gotten into his car; the presence of the car has significantly altered the compass' interference field, but the change in the location of the portable on Earth is by contrast small (in terms of experiencing a change in the geomagnetic field). Other user contexts that can cause an expected change in the monitored magnetic field relative to an expected change in the monitored POM, signifying a change in the environment calling for recalibration, are possible.

Figure 3:
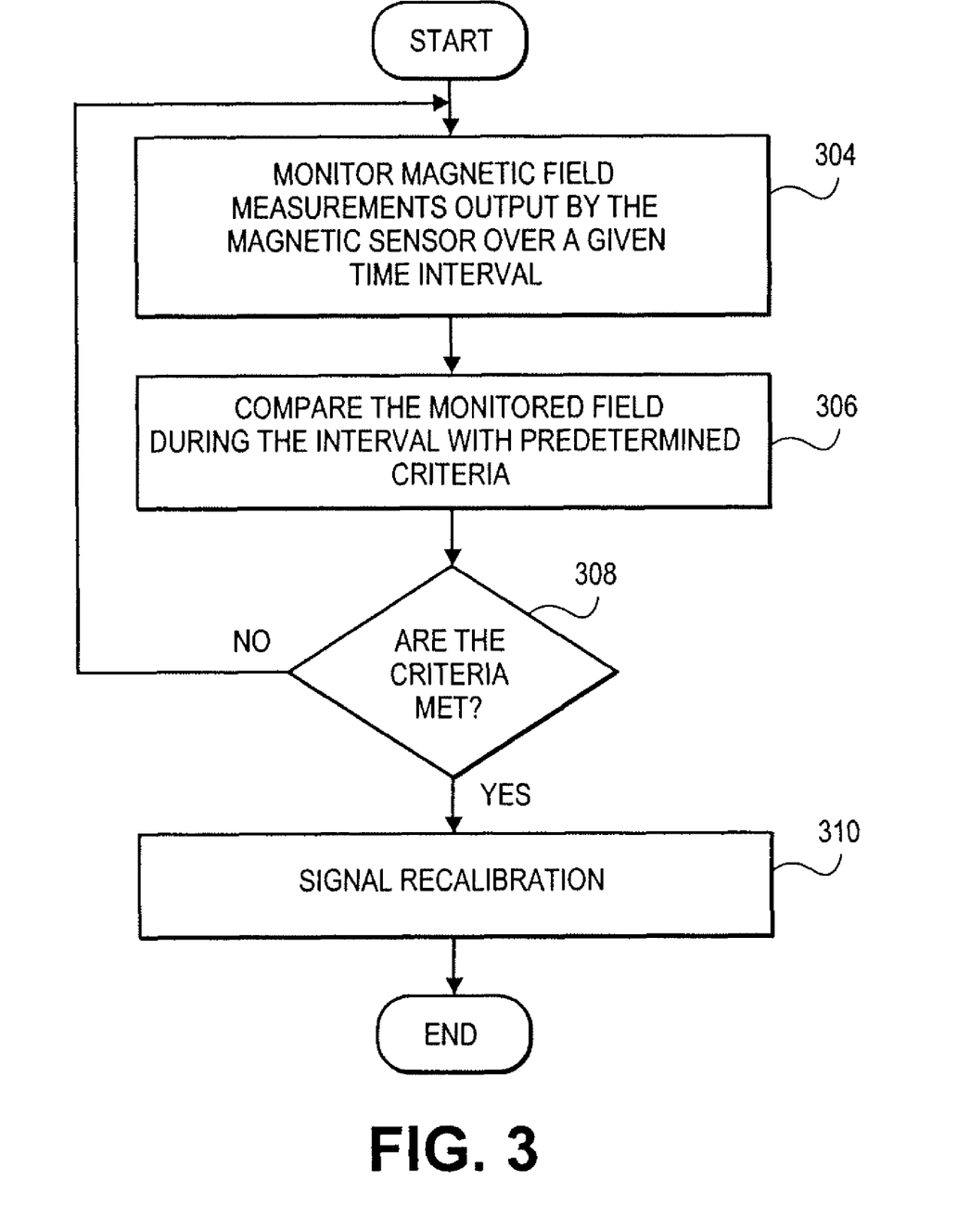
FIG. 3 is a flow diagram of an example process for signaling recalibration accuracy of the compass function.
Figure 4:
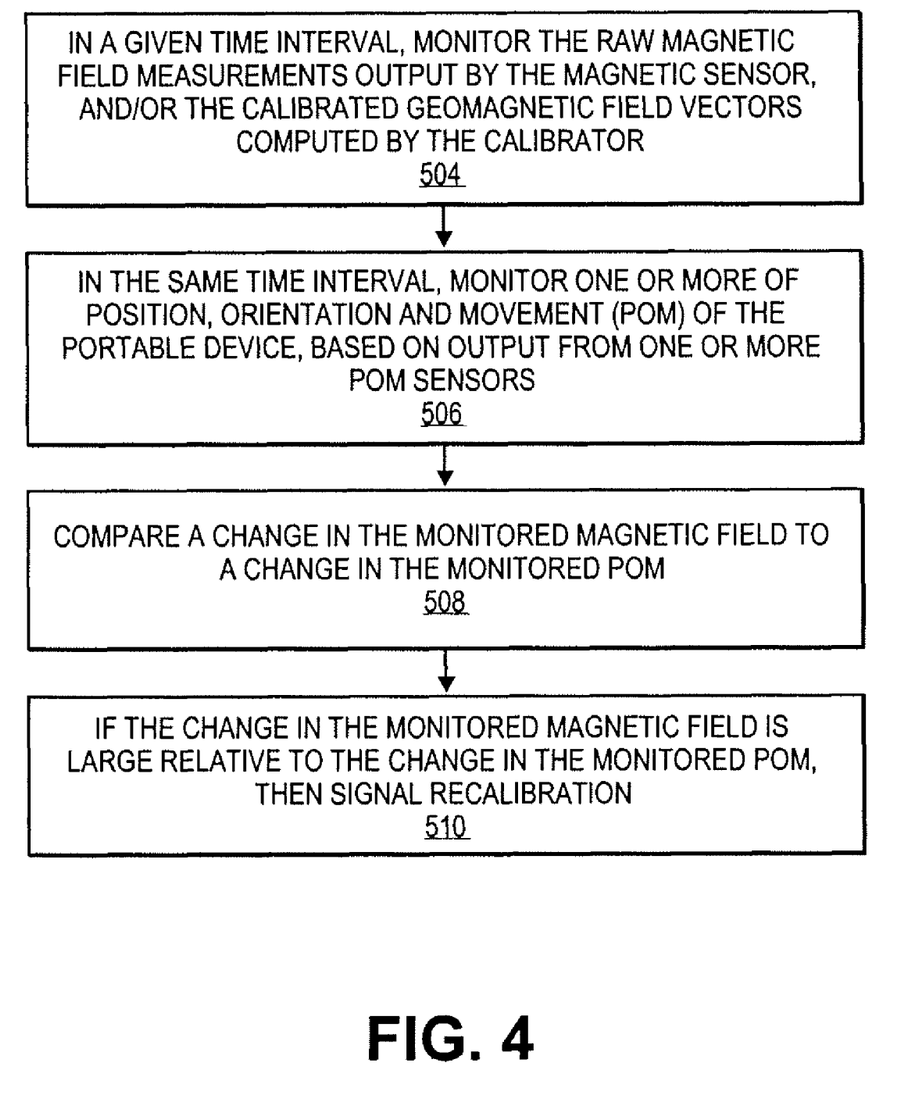
FIG. 4 is a flow diagram of another example process for signaling recalibration.

The dynamic compass calibration indicator 117 monitors a magnetic field surrounding the device and may perform other operations, as they are depicted in the flow diagrams of FIG. 3 and FIG. 4.

Referring to the process depicted in FIG. 3, magnetic field measurements output by the magnetic sensor 102, and/or by the calibrator 106, are monitored over a given time interval (operation 304). For example, instances of the magnitude of the raw magnetic field are monitored over ten seconds. The monitored magnetic field during that interval is compared to predetermined criteria (operation 306). If the criteria are met, then a recalibration is signaled (operation 308). The magnetic field continues to be monitored in this manner (e.g., by keeping a running average over the past ten seconds) and checked, until the criteria are met.

In a further embodiment, monitoring the magnetic field in operation 304 includes both monitoring the magnitude of the raw field and monitoring the inclination of the geomagnetic field. The monitored magnitude and inclination are both compared to predetermined criteria and if met, calibration is signaled.

Referring to the process illustrated in FIG. 4, the raw magnetic field measurements output by the magnetic sensor 102 are monitored, and/or the calibrated geomagnetic field vectors, computed by the calibrator 106, are monitored (operation 504). In addition, one or more of position, orientation and movement (POM) of the device 100 are monitored, based on output from one or more POM sensors 113 (operation 506). For example, moving averages of the magnetic field and one or more POM values are maintained. All of this monitoring is over a given time interval, e.g. the past ten seconds, during which the device 100 is being used in its normal course by the end user. A change in the monitored magnetic field is compared to a change in the monitored POM (operation 508). For example, a percentage change in the moving average of the magnetic field is computed, as well as a percentage change in the POM. If the change in the monitored magnetic field is large relative to the change in the monitored POM, then a recalibration is signaled (operation 510). For instance, if the magnetic field increases by what is considered to be a "large" amount in the given time interval, while the location on Earth (as computed for instance by a GPS) or acceleration has changed by what is considered to be a "small" amount during that same time interval, then the portable device 100 has likely moved into a different magnetic environment. Accordingly, a recalibration is called for.

The above-described functional components of the portable device 100 that are relevant to its compass function may be implemented in a variety of different ways. As is typical of current and future portable devices, the functionality therein is implemented using a combination of hardware, including hardwired circuitry, and software. In particular, the device 100 may have programmable circuitry that has been either previously configured by the manufacturer or executes a user downloadable program that is stored in the device 100, to perform many of the functions described above. Program storage may be implemented using one or more of various types of data storage media, e.g. fixed volatile or non-volatile solid state memory such as random access memory, removable non-volatile storage such as a flash memory card, and fixed mass storage such as an optical or magnetic rewritable disk drive. The storage may contain several program modules including, for instance, those that govern the functions of the calibrator 106, as well as that of the dynamic compass calibration indicator 117 and the user interface module 112. The programmed processor may include any suitable combination of programmable logical processing circuitry typically available for portable devices, such as an applications processor that is integrated in a typical multi-function smart phone, a central processing unit (CPU) such as that which may be found in a dedicated portable digital camera or a laptop personal computer, and a dedicated microcontroller or digital signal processor (DSP) chip. Although not explicitly shown in the figures, the coupling between the different functional unit blocks is understood to include all necessary analog and /or digital circuitry for interfacing between different types of signaling and integrated circuit topologies. Finally, in most instances, all of the signal processing functionality depicted in FIG. 2 may be implemented using solid state and integrated circuit packages that are integrated within the housing of the portable device 100. Additional features of the portable device 100, such as a battery as the main rechargeable power source, communications interfaces for communicating with networks such as telephone networks and data networks, and physical or virtual user interfaces such as keypads and touch screens, have not been described for the sake of brevity.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For example, although FIG. 1 depicts the portable device 100 as a smart phone, the accuracy indicator technology described here may also be implemented in other portable devices, such as a dedicated navigation device. Also, although the operations of a process are represented in a figure (and described) in a particular sequence, that sequence may not be required in all instances of that process. The description is thus to be regarded as illustrative instead of limiting.

What is claimed is:

1. A machine-implemented method for dynamic calibration of a compass in a portable device, comprising:
   detecting a sensed magnetic field in the device using the compass, over a given time interval;
   detecting one of position, orientation and movement data about the device using position, orientation or movement (POM) sensor in the device;
   computing a geomagnetic field based on the sensed magnetic field;
   computing inclination of the geomagnetic field over the given time interval to maintain a running average;
   comparing the sensed magnetic field and the position, orientation or movement data with predetermined criteria; and
   signaling a recalibration of the compass based on the comparison.

2. The method of claim 1 wherein the detecting the sensed magnetic field comprises:
   maintaining a running average of a magnitude of the sensed magnetic field.

3. The method of claim 1 further comprising:
   comparing the inclination with predetermined criteria, wherein signaling the recalibration is further based on the comparison involving the inclination.

4. A portable device comprising:
   a portable device housing having integrated therein
   a position, orientation or movement (POM) sensor to provide one of position, orientation and movement data concerning the portable device,
   a magnetic sensor to provide a sensed, magnetic field,
   a compass calibrator coupled to the magnetic sensor, and
   an indicator module to monitor the sensed magnetic field and the position orientation or movement data over a given time interval, compare the monitored sensed magnetic field and the position, orientation or movement data with predetermined criteria, and, based on the comparison, signal the calibrator to recalibrate, wherein the indicator module is to monitor inclination of a geomagnetic field so as to maintain a running average of the inclination, over the given time interval.

5. The portable device of claim 4 wherein the indicator module is to monitor a magnitude of the sensed magnetic field so as to maintain a running average of the magnitude.

6. The portable device of claim 4 wherein the indicator module is to compare the inclination with predetermined criteria and signal the recalibration further based on the inclination comparison.

7. An article of manufacture comprising:
   a non-transitory machine-readable medium having stored thereon instructions that program a processor in a portable device to detect a sensed magnetic field in the device over a given time interval, monitor one of position, orientation and movement data from a position, orientation or movement sensor (POM sensor) in the device over the given time interval, compute inclination of a computed geomagnetic field so as to maintain a running average of the inclination, compare the sensed magnetic field with predetermined criteria, and signal a recalibration of a compass based on the comparison.

8. The article of manufacture of claim 7 wherein the non-transitory machine-readable medium contains further instructions that program the processor to monitor a magnitude of the sensed magnetic field so as to maintain a running average of the magnitude.

9. The article of manufacture of claim 7 wherein the non-transitory machine-readable medium contains further instructions that program the processor to compare the inclination with predetermined criteria and signal the recalibration further based on the inclination comparison.

10. A machine-implemented method for dynamic calibration of a compass in a portable device, comprising:
    monitoring, by an indicator module, a magnetic field surrounding the device during a given time interval;
    monitoring, using a position, orientation, or movement (POM) sensor, one or more of position, orientation, and movement of the device during the given time interval;
    computing a geomagnetic field based on the magnetic field;
    computing inclination of the geomagnetic field during the given time interval to maintain a running average;
    comparing a change in the monitored magnetic field with a change in the monitored position, orientation, or movement; and
    signaling a recalibration of the compass when the change in the monitored magnetic field is large relative to the change in the monitored position, orientation or movement.

11. The method of claim 10 wherein the monitoring one or more of position, orientation and movement of the device comprises maintaining a running average of acceleration of the device.

* * * * *

UNITED STATES PATENT AND TRADEMARK OFFICE
CERTIFICATE OF CORRECTION

| | | |
|---|---|---|
| PATENT NO. | : 8,239,153 B2 | Page 1 of 1 |
| APPLICATION NO. | : 12/479203 | |
| DATED | : August 7, 2012 | |
| INVENTOR(S) | : Patrick S. Piemonte et al. | |

It is certified that error appears in the above-identified patent and that said Letters Patent is hereby corrected as shown below:

In the Claims:

Column 7, in claim 1, line 32, please insert --a-- between 'using' and 'position'.

Signed and Sealed this
Eighteenth Day of December, 2012

David J. Kappos
*Director of the United States Patent and Trademark Office*